US007835457B2

(12) United States Patent
Friedrich et al.

(10) Patent No.: US 7,835,457 B2
(45) Date of Patent: Nov. 16, 2010

(54) DEMODULATING A SIGNAL HAVING MULTIPLE FREQUENCY BANDS

(75) Inventors: Martin Friedrich, Gelsenkirchen (DE); Christian Grewing, Sollentuna (SE); Giuseppe Li Puma, Bochum (DE); Christoph Sandner, Villach (AT); Andreas Wiesbauer, Pörtschach (AT); Kay Winterberg, Kempen (DE); Stefan Van Waasen, Sollentuna (SE)

(73) Assignee: Infineon Technologies AG, Neubiberg (DE)

( * ) Notice: Subject to any disclaimer, the term of this patent is extended or adjusted under 35 U.S.C. 154(b) by 897 days.

(21) Appl. No.: 11/017,522

(22) Filed: Dec. 20, 2004

(65) Prior Publication Data

US 2005/0141411 A1 Jun. 30, 2005

(30) Foreign Application Priority Data

Dec. 22, 2003 (DE) ................................ 103 60 470

(51) Int. Cl.
*H04K 1/10* (2006.01)
*H04L 27/28* (2006.01)
*H04L 27/00* (2006.01)

(52) U.S. Cl. ........................ 375/261; 375/260; 375/267; 375/269; 375/324; 455/59; 329/304; 329/306; 370/204; 370/206

(58) Field of Classification Search ........................ None
See application file for complete search history.

(56) References Cited

U.S. PATENT DOCUMENTS 4,569,075 A * 2/1986 Nussbaumer ............... 704/203
4,768,187 A * 8/1988 Marshall ...................... 370/343
5,598,435 A * 1/1997 Williams ..................... 375/261
5,621,345 A * 4/1997 Lee et al. ..................... 327/254
6,047,306 A * 4/2000 Hikita et al. ................ 708/815
6,118,810 A * 9/2000 Wynn .......................... 375/219
6,192,225 B1 * 2/2001 Arpaia et al. ............ 455/196.1
6,215,828 B1 * 4/2001 Signell et al. ............... 375/316
6,333,767 B1 * 12/2001 Patel et al. .................. 348/725
6,335,952 B1 * 1/2002 Lee et al. ..................... 375/327
6,337,885 B1 * 1/2002 Hellberg ..................... 375/316
6,813,310 B1 * 11/2004 Okanobu .................... 375/216
6,922,451 B1 * 7/2005 Ichihara ...................... 375/334

(Continued)

FOREIGN PATENT DOCUMENTS

WO WO 2004001998 A1 * 12/2003

*Primary Examiner*—Shuwang Liu
*Assistant Examiner*—Gina McKie
(74) *Attorney, Agent, or Firm*—Dicke, Billig & Czaja, PLLC

(57) ABSTRACT

A method and an arrangement for processing a received signal which comprises phase-shift modulated or amplitude-quadrature modulated part-signals which are transmitted in a plurality of different frequency bands, wherein the received signal is processed in a plurality of stages in succession, by multiplying all the input signals to each of the stages by two mutually orthogonal signals in each case to form two intermediate signals in each case, wherein the intermediate signals from one stage in each case act as the input signals to whichever is the succeeding stage in the particular case and the received signal acts as the input signal to the first stage, and wherein an in-phase and/or an quadrature component of the individual part-signals in the different frequency bands are determined from the intermediate signals from the last stage. Parallel, simultaneous reception of a plurality of frequency bands can be implemented relatively easily in this way.

33 Claims, 5 Drawing Sheets

U.S. PATENT DOCUMENTS 7,031,686 B2 * 4/2006 Kim et al. .................. 455/285
7,085,549 B2 * 8/2006 Peterson et al. ............. 455/323
7,103,109 B2 * 9/2006 Nakache et al. ............. 375/295
7,120,406 B2 * 10/2006 van der Burgt ........... 455/168.1
7,200,188 B2 * 4/2007 Fague et al. ................. 375/326
7,340,230 B2 * 3/2008 Khoini-Poorfard et al. .. 455/132
2001/0014594 A1 * 8/2001 Khlat et al. ................. 455/303
2002/0044613 A1 * 4/2002 Brankovic et al. .......... 375/329
2002/0048325 A1 * 4/2002 Takahiko .................... 375/295
2002/0051503 A1 * 5/2002 Takahiko .................... 375/327
2002/0131523 A1 * 9/2002 Nagasaka et al. ........... 375/297
2003/0203743 A1 * 10/2003 Sugar et al. .............. 455/550.1
2004/0151109 A1 * 8/2004 Batra et al. ................. 370/208
2005/0062629 A1 * 3/2005 Roger et al. ................ 341/144

* cited by examiner

DEMODULATING A SIGNAL HAVING MULTIPLE FREQUENCY BANDS

CROSS-REFERENCE TO RELATED APPLICATIONS

This Utility Patent Application claims priority to German Patent Application No. DE 103 60 470.7, filed on Dec. 22, 2003, which is incorporated herein by reference.

FIELD OF THE INVENTION

The present invention relates to a method and an arrangement for processing a received signal which comprises phase-shift modulated or quadrature amplitude modulated pulses transmitted in a plurality of different frequency bands. It relates in particular to a method and an arrangement for received signals according to the ultra wideband standard employing a multichannel frequency hopping method. A method and an arrangement of this kind can be used in particular in an analogue front-end of a receiver for wireless communications.

BACKGROUND

What are termed ultra wideband signals (UWB signals) are transmitted in a frequency range from 3.1 GHz to 10.6 GHz. A proposal for a new UWB transmission standard makes provision for this frequency range to be divided into 16 sub-bands or frequency bands each with a width of 538 MHz, as is shown schematically in FIG. 9. f1-f16 denote the frequency bands in this case or their center frequencies; f means frequency. Pieces of data, which may for example be intended for a plurality of users or for different blocks within a receiver, can then be transmitted separately in respective ones of the different frequency bands.

What are usually used in this case are the bottom eight sub-bands f1-f8. FIG. 10 shows a typical transmission signal under this proposed standard. The information to be transmitted is transmitted in this case in the form of short pulses of length Tp, with the pulses for the different frequency bands being transmitted serially. The sequence f1, f6, f3, etc. shown in FIG. 10 is of course only one possibility. The pulse length Tp may for example be selected in this case in such a way that it is equal to the inverse of the width of the frequency bands. Each pulse corresponds for example to one bit, with the information being coded in each case by binary phase-shift keying (BPSK) or quadrature phase-shift keying (QPSK). The bit rate is therefore determined by the time Tb required to transmit a pulse in each frequency band that is used. The distance between the beginnings of two successive pulses, which corresponds to the bit rate, is marked as Tr in FIG. 10.

FIG. 11 shows an analogue section of a conventional receiver for signals of this kind. The received signal a is received by an antenna 1 in this case and is fed to a filter 22. It is then amplified by a low-noise amplifier (LNA) 2 and a variable-gain amplifier 3. The amplifier 3 may be used in this case in particular to set gain as a function of the strength of the received signal a.

Having been amplified in this way, the signal is fed to N units 27, where N is the number of frequency bands to be processed, which is eight in the example shown in FIG. 10. Each of the units 27 separates out one of the frequency bands. This is done by in each case mixing the amplified received signal in a mixer 23 with a signal LOi (i=1 . . . N) generated by a local oscillator. A bandpass filter 24 then filters out that component part of the mixed signal which corresponds to the difference between the frequency of signal LOi and the frequency of the particular frequency band fi. The frequencies of the signals LOi are preferably selected in this case in such a way that all the filters 24 can be of the same design. The signal is then amplified by a programmable amplifier 25 and digitized by means of an analogue-to-digital converter 26. The digitized signal is then subjected to further processing.

A receiver of this kind is relatively costly and complicated to implement because the unit 27 has to be provided for each frequency band fi, which means that in the example shown eight analogue-to-digital converters are required.

SUMMARY

The invention provides a method and an arrangement (i.e., system) for processing a received signal, suitable for use in wireless communications.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated, as they become better understood by reference to the following detailed description. The elements of the drawings are not necessarily to scale relative to each other. Like reference numerals designate corresponding similar parts.

DETAILED DESCRIPTION

Figure 1:
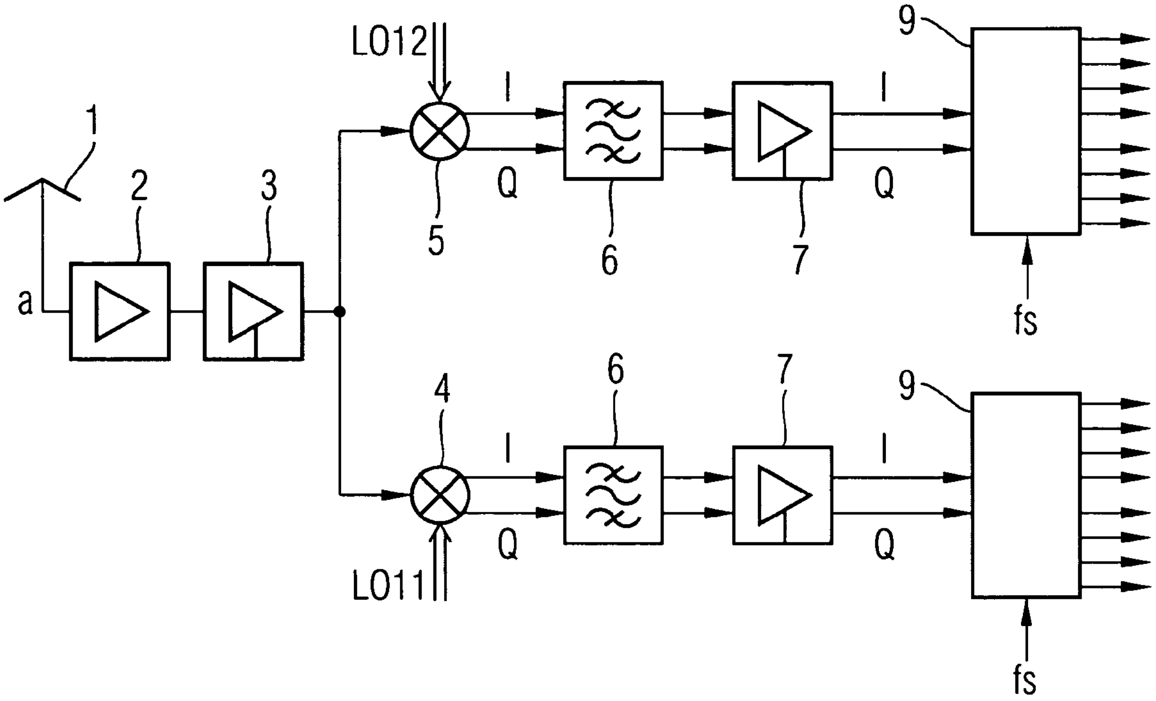
FIG. 1 is a block circuit diagram illustrating a first embodiment of the invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention provides a method and an arrangement for demodulating a received signal of this kind having several frequency bands which do not require individual hardware for each frequency band and are therefore more convenient to implement.

In accordance with one embodiment of the invention, to demodulate a received signal which comprises phase-shift modulated or quadrature amplitude modulated part-signals transmitted in a plurality of different frequency bands, it is proposed that the received signal be processed in a plurality of stages in succession by multiplying all the input signals to each of the stages by two mutually orthogonal signals in each case in order to form two intermediate signals in each case, with the intermediate signals from one stage in each case acting as the input signals to whichever is the succeeding stage in the particular case and with a signal derived from the received signal acting as the input signal to the first stage, and that in-phase and/or quadrature components of the part-signals in the different frequency bands be calculated from the intermediate signals from the last stage. The two intermediate signals are in this case essentially the in-phase and quadrature components of the input signal in the given case.

By means of this step-by-step processing, the number of analog-to-digital converters required can be reduced and an arrangement for the efficient parallel and simultaneous reception of signals transmitted in a plurality of different frequency bands can be created.

In the processing, the frequency bands of the received signal are advantageously converted down in the stages to a single frequency band. The processing in the final n stages is preferably performed digitally, whereas the processing in the first m stages is preferably performed in analogue fashion. Entirely digital processing would also be possible in principle if analogue-to-digital converters having a sufficiently high sampling rate could be provided.

The digitizing of the input signals in the first of the final n stages preferably takes place in this case at a sampling frequency which is a multiple of the frequency of the input signals to the first of the final n stages. In this way, the multiplication of the input signals by the two mutually orthogonal signals in the final n stages can be performed by multiplying them by factors of 1, 0 or −1, which is equivalent to the sampled values of the particular input signal being sorted and can thus be performed efficiently.

The mixed signals which are generated in the first m analogue stages by multiplying the respective input signals by the respective mutually orthogonal signals are preferably bandpass filtered to generate the intermediate signals, with mixed signals being filtered out whose frequencies do not correspond to a difference frequency between the frequency of the orthogonal signals and the frequency of frequency bands, from the different frequency bands, which are to be processed in the stages following the particular stage. The mutually orthogonal signals in any given one of these first m stages are advantageously of a frequency which is between two adjoining ones of the frequency bands of the input signals in the given case.

The calculation of the in-phase or quadrature components of the part-signals in the different frequency bands can be performed by setting up a system of linear equations which defines the relationships of the components of the part-signals to the intermediate signals from the last of the stages, and by solving this system of linear equations.

By means of the division which has been described between analogue and digital stages, the number of analogue-to-digital converters required, and the sampling rate required from these analogue-to-digital converters, can be optimized.

In the first stage, the different frequency bands can be divided into at least two groups which can be processed separately in succeeding stages.

Figure 9:
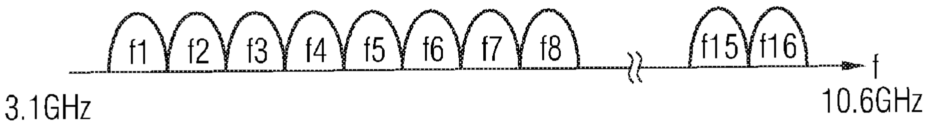
FIG 9 (PRIOR ART)
FIG. 9 illustrates the position of frequency bands under the ultra wideband standard with frequency hopping.
Figure 10:
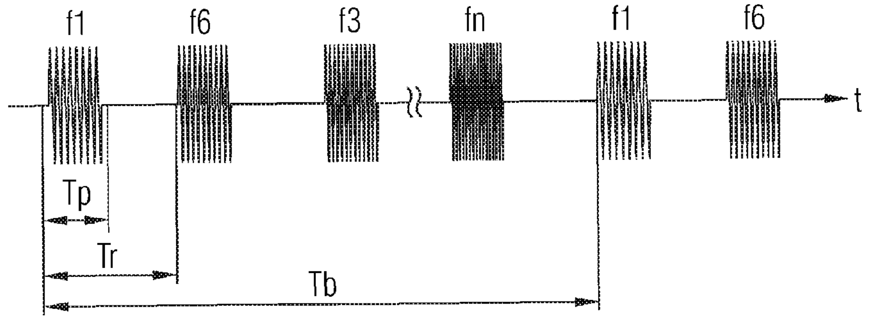
FIG 10 (PRIOR ART)
FIG. 10 illustrates an illustrative ultra wideband signal employing frequency hopping and FIG. 11 illustrates a prior art arrangement.
Figure 11:
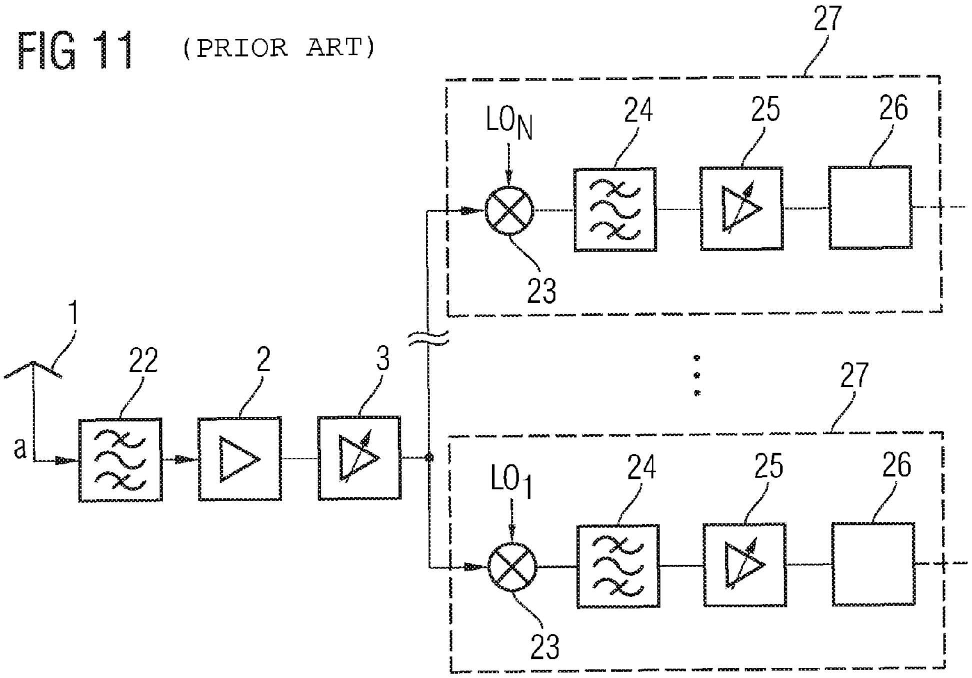
FIG 11 (PRIOR ART)

FIG. 1 is a block circuit diagram illustrating a first embodiment of the present invention. A received signal a is, for example, received by an aerial 1 in this case. The received signal a is for example an ultra wideband (UWB) signal employing frequency hopping, of the kind which was elucidated in the introduction to the description with reference to FIGS. 9 and 10, i.e. a signal in which short part-signals or pulses of a pulse length Tp are transmitted in succession in different frequency bands. The individual part-signals are BPSK-modulated or QPSK-modulated in this case.

The received signal a is fed to a low-noise amplifier 2 and a variable-gain amplifier 3. Having been amplified in this way, the signal is fed to a first mixer 4 and a second mixer 5. In the first mixer 4 the signal is multiplied by a signal LO11 to generate an I (in-phase) component and Q (quadrature) component. This is accomplished by multiplying the amplified received signal a by the signal LO11 to generate the I-component and by the signal LO11 being phase-shifted by 90° to generate the Q-component. A mixture with the signal LO12 is performed in a similar way in the second mixer 5.

Figure 2:
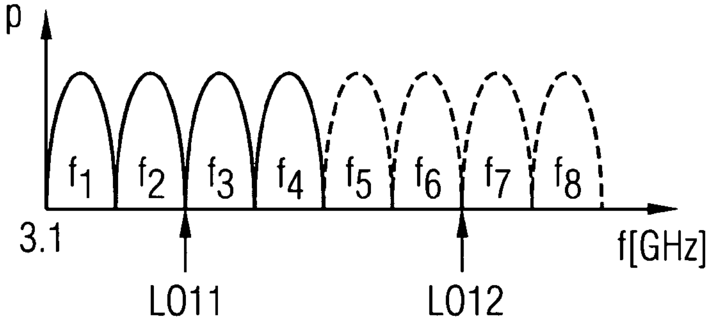
FIG. 2 illustrates the position of frequency bands and frequencies of signals from FIG. 1.

The arrangement is designed in this case to receive signals which are transmitted in the frequency bands f1-f8 shown in FIG. 2. The positions of the frequencies of the signals LO11 and LO12 are as shown in FIG. 2 in this case, that is to say that the frequency of LO11 is between frequency bands f2 and f3 whereas the frequency of signal LO12 is between frequency bands f6 and f7.

Figure 3:
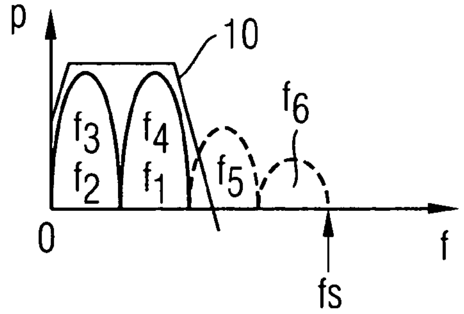
FIG. 3 illustrates the mode of operation of a mixer and a filter from FIG. 1.

The I-component and Q-component which have been generated in this way are then fed to a bandpass filter 6. The way in which the bandpass filter 6 in the lower branch of the circuit in FIG. 1 operates is shown in FIG. 3. p denotes the spectral power density of the signals in this case. By mixing the amplified received signal a with the signal LO11, what are generated amongst other things are signals whose frequency corresponds to the difference between the frequency of signal LO11 and that of the received signal a. As a result of the frequency of signal LO11 having been selected in the way shown in FIG. 2, for the frequency bands f2 and f3, and f1 and f4, these "difference signals" are each of the same frequency, as shown in FIG. 3. The bandpass filter 6 has a passband which is indicated by a curve 10 in FIG. 3. The filter 6 thus causes only the components generated by the frequency bands f1-f4 to be selected for further processing in the lower branch of the circuit.

The bandpass filter 6, which can also be designated a channel filter, is preferably implemented in the form of a polyphase filter in this case. The particular advantage this has is that allowance can be made for the sign of the frequency in the filtering.

The bandpass filter 6 in the upper branch of the circuit is of substantially the same size as that in the lower branch; by selecting the frequency of the signal LO12, it is the frequency bands f5-f8 that are selected for further processing in this case. In what follows it will only be the lower branch that is looked at but the signal processing in the upper takes place in a similar way.

As illustrated in FIG. 3, a low-pass filter can, in principle, also be used instead of the bandpass filter 6.

The bandpass filter 6 is followed by a programmable amplifier 7, with the gain being selected in this case in such a way that the signals are of a strength suitable for the digital unit 9 which follows. The digital unit 9 comprises an analogue-to-digital converter which samples the I-component and Q-component fed to it at a sampling frequency fs which is preferably selected to be as illustrated in FIG. 3, i.e., to be equal to four times the width of a frequency band. What this means is that the sampling frequency corresponds to four times the centre frequency or first intermediate frequency of the signals that are generated by the first mixer 4 and filtered out by the band-pass filter 6.

If, as explained in the introduction to the description, the length of the individual part-signals or pulses is selected to be such that it substantially corresponds to the inverse frequency, the first intermediate frequency after the first mixer 4 is approximately 2/Tp and the sampling frequency fs is then 8/Tp.

The sampling frequency fs corresponds in this case exactly to the Nyquist rate of the highest frequency to be processed.

Figure 4:
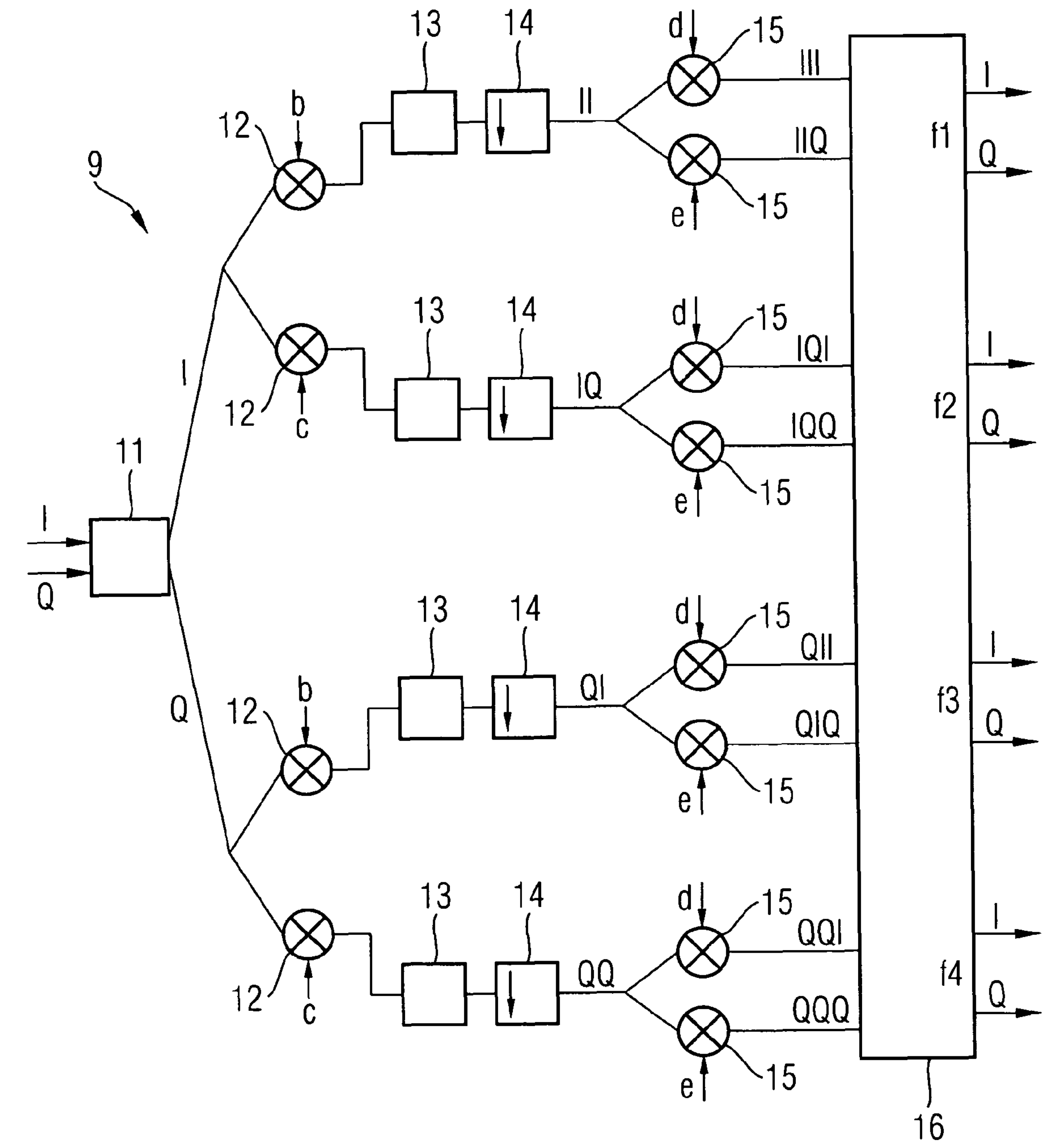
FIG. 4 is a block circuit diagram of a digital section of the embodiment of FIG. 1.

In what follows, the way in which the digital unit 9 operates will be explained in more detail by reference to FIG. 4. The digital unit 9 comprises an analogue-to-digital converter 11 which samples and digitizes the incoming I- and Q-components at the sampling frequency fs. The I- and Q-components are then processed in a first digital stage by multipliers 12. Both the I-component and the Q-component are multiplied by a signal b in respective mixers 12 and by a signal c in respective other mixers 12. Each pair of these mixers corresponds in this case to a respective one of the mixers 4 and 5 in the analogue stage shown in FIG. 1, because the signals b and c are orthogonal to one another. Because the sampling frequency fs corresponds to four times the first intermediate frequency, the mixing in the mixer 12 can be performed by simple multiplication at the corresponding clock rate fs by values of 1, 0, −1, 0 in the case of signal b and 0, 1, 0, −1 in the case of signal c. The work done by respective ones of the two mixers 12 can thus be looked upon as simple sorting of the incoming I-signal and the incoming Q-signal respectively and not as a genuine multiplication, which allows the implementation to be simpler. This simplification is described in detail in WO 01/60007 A1, the content of which is incorporated by reference herein.

Because what is performed here is virtually a sorting of the data and the data values are only required at discrete points in time, the analogue-to-digital converter 11 can either sample the I-signal fed to it and the Q-signal fed to it separately at the sampling frequency fs, or a single analogue-to-digital converter 11 can be provided which operates at twice the frequency and switches between the I and Q signals.

Because every second value is multiplied by 0, i.e., is cancelled out, the frequency of the incoming signal is as it were halved by the multiplier 12. The corresponding frequency is produced by a combination of a low-pass filter 13 having a limiting frequency equal to the first intermediate frequency, i.e. to twice the second intermediate frequency, and a decimator 14, downstream of each mixer 12. The signals produced in this way are designated II, IQ, QI and QQ, because I- and Q-components are once again formed in this case, from the original I- and Q-components.

This first digital stage, in which the frequency of the signal is converted down, is followed by a second digital stage having multipliers 15 which operate in a similar way to the multipliers 12. The signals d and e for forming the I- and Q-components in the respective cases can once again be selected very easily by performing this multiplication with four times the second intermediate frequency, the latter being the frequency of the second intermediate signals II-QQ, which means that once again, in a similar way to what is done in the first digital stage, a particularly simple kind of multiplication can be performed, namely by d=1, 0, −1, 0 and e=0, 1, 0, −1. The signals generated in this way are designated III, IIQ, IQI, IQQ, QII, QIQ, QQI and QQQ and are fed to a calculating unit 16 to allows the I- and Q-components belonging to the frequency bands f1-f4 to be calculated.

As is shown below, this calculation can be performed by simple addition and subtraction in the course of solving a system of linear equations. It can easily be shown mathematically that what the relationship between the signals generated downstream of the second digital stage having the multipliers 15 and the signals in the corresponding frequency bands looks like is shown by the following system of linear equations:

$$III: +y1+y2+y3+y4:=A1$$

$$IIQ: -y1+y2-y3+y4:=A2$$

$$IQI: -y1-y2+y3+y4:=A3$$

$$IQQ: -y1+y2+y3-y4:=A4$$

$$QII: +y1+y2+y3+y4:=B1$$

$$QIQ: +y1-y2+y3-y4:=B2$$

$$QQI: +y1+y2-y3-y4:=B3$$

$$QQQ: -y1+y2+y3-y4:=B4$$

where y1, y2, y3 and y4 are the signals in the frequency bands f1, f2, f3 and f4 respectively. To enable the I- and Q-components each to be determined in the individual frequency bands, the above eight signals generated in the second digital stage must be divided into I-components and Q-components, the I-components being those having an even number of "Qs" and the Q-components those having an odd number of "Qs", because a phase shift of 90° is made in the sampling for each Q. What is then obtained as a solution to this system of linear equations is, finally:

$$y1,I=A1-A4+B2+B3$$

$$y1,Q=-A2-A3+B1-B4$$

$$y2,I=A1+A4-B2+B3$$

$$y2,Q=A2-A3+B1+B4$$

$$y3,I=A1+A4+B2+B3$$

$$y3,Q=-A2+A3+B1+B4$$

$$y4,I=A1-A4-B2-B3$$

$$y4,Q=A2+A3+B1-B4$$

If only the I-component or the Q-component is required, then of course it is only the component that is desired in the particular case that has to be calculated.

It is of course also possible for other systems of linear equations to be set up whose equations and solutions are linear combinations of the equations and solutions respectively of the system of equations shown. In principle, the signals y1 to y4 may also be divided into components other than I- and Q-components, which are then calculated.

Figure 5:
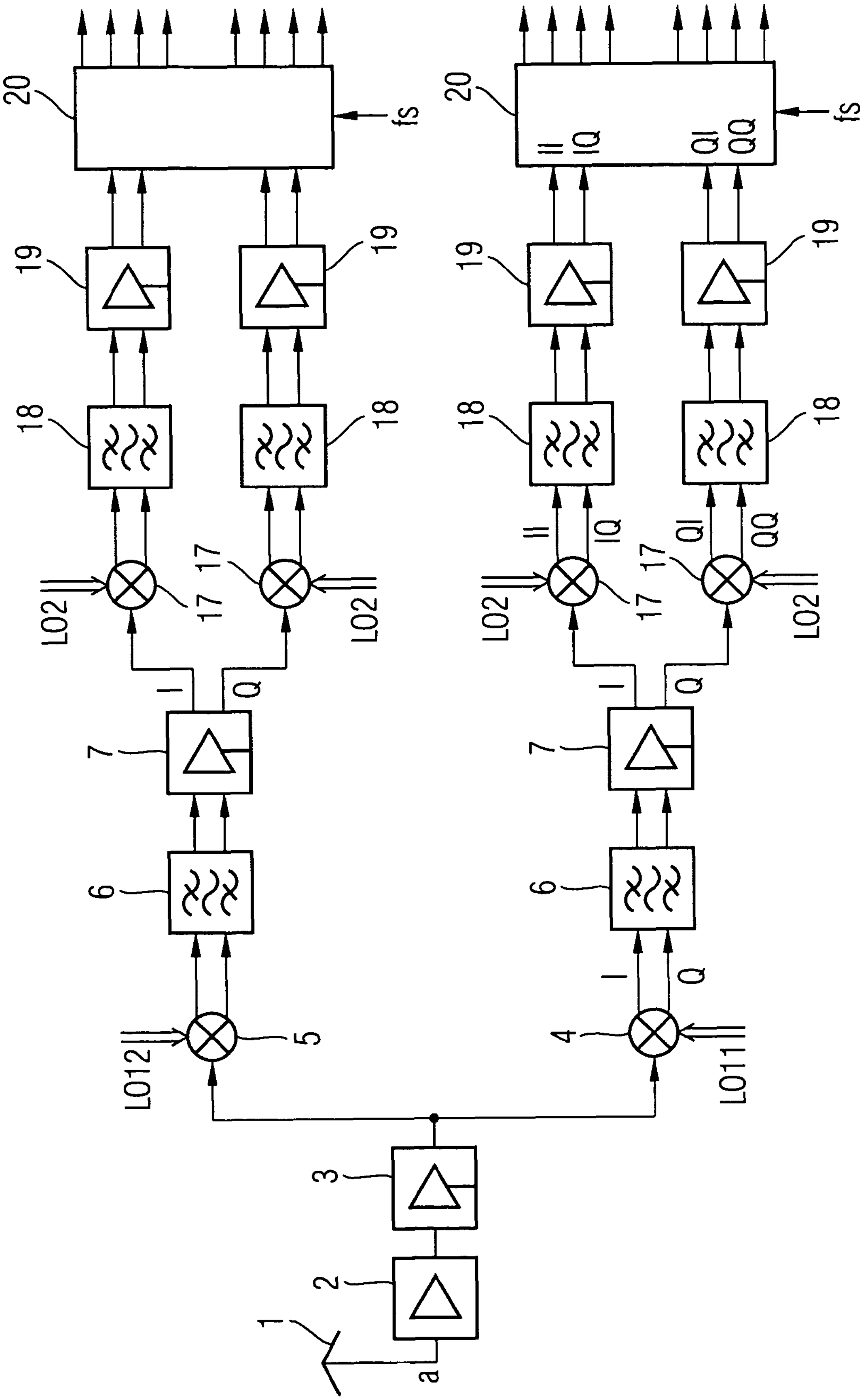
FIG. 5 is a block circuit diagram illustrating a second embodiment of the invention.

In FIG. 5 is illustrated a block circuit diagram of a second embodiment of the present invention. Components which are the same as those in the first embodiment are identified by the same reference numerals.

The embodiment illustrated in FIG. 5 comprises a first mixer stage in which the amplified received signal a is mixed with signals LO11 and LO12 respectively in a first mixer 4 and a second mixer 5. Up to and including the programmable amplifier 7, the construction is the same as in the first embodiment and will therefore not be explained again. In the second embodiment, the first analogue mixing stage having the mixers 4 and 5 is followed by a second analogue mixing stage having mixers 17. The mixers 17 are once again in the form of so-called IQ mixers, which means that they multiply the signal fed to them by a signal LO2 and the signal LO2 being phase-shifted by 90°, so that I- and Q-components are once again obtained. In what follows it will again be only the lower branch of the circuit which is explained because the upper branch is arranged in a similar way.

Figure 6:
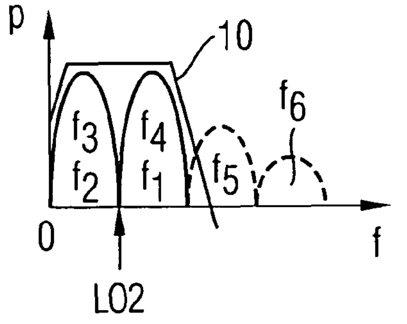
FIG. 6 illustrates one embodiment of the operation of a mixer and a filter of the embodiment of FIG. 5.
Figure 7:
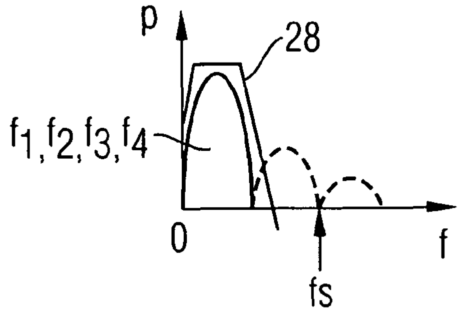
FIG. 7 illustrates the operation of a further mixer and a further filter of the embodiment of FIG. 5.

The frequency of the signal LO2 is selected in this case to be as illustrated in FIG. 6, i.e. it is between the two frequency bands which respectively correspond to the original frequency bands f1 and f4, and f2 and f3. Otherwise FIG. 6 corresponds to FIG. 3 which has already been described. In a similar way to what happens in the first digital stage of the first embodiment which was described with reference to FIG. 4, this mixing generates signals II, IQ, QI and QQ. The mixers 17 are followed by bandpass filters 18 which once again filter out the difference frequencies between the frequency bands f1-f4 processed in the lower branch and which, like the bandpass filters 6, may take the forms of polyphase filters. The passband of the bandpass filters 18 is represented in FIG. 7 by a curve 28; in principle a low-pass filter could, once again, equally well be used. Hence, downstream of the second analogue mixer stage all the original frequency bands are in a single frequency band.

The bandpass filters 18 are once again followed by programmable amplifiers 19 to allow a gain to be set. The signals generated in this way are fed to a digital unit 20. This digitizes the signals at a sampling frequency fs which is likewise illustrated in FIG. 7 and which corresponds to half the sampling frequency in the first embodiment.

Figure 8:
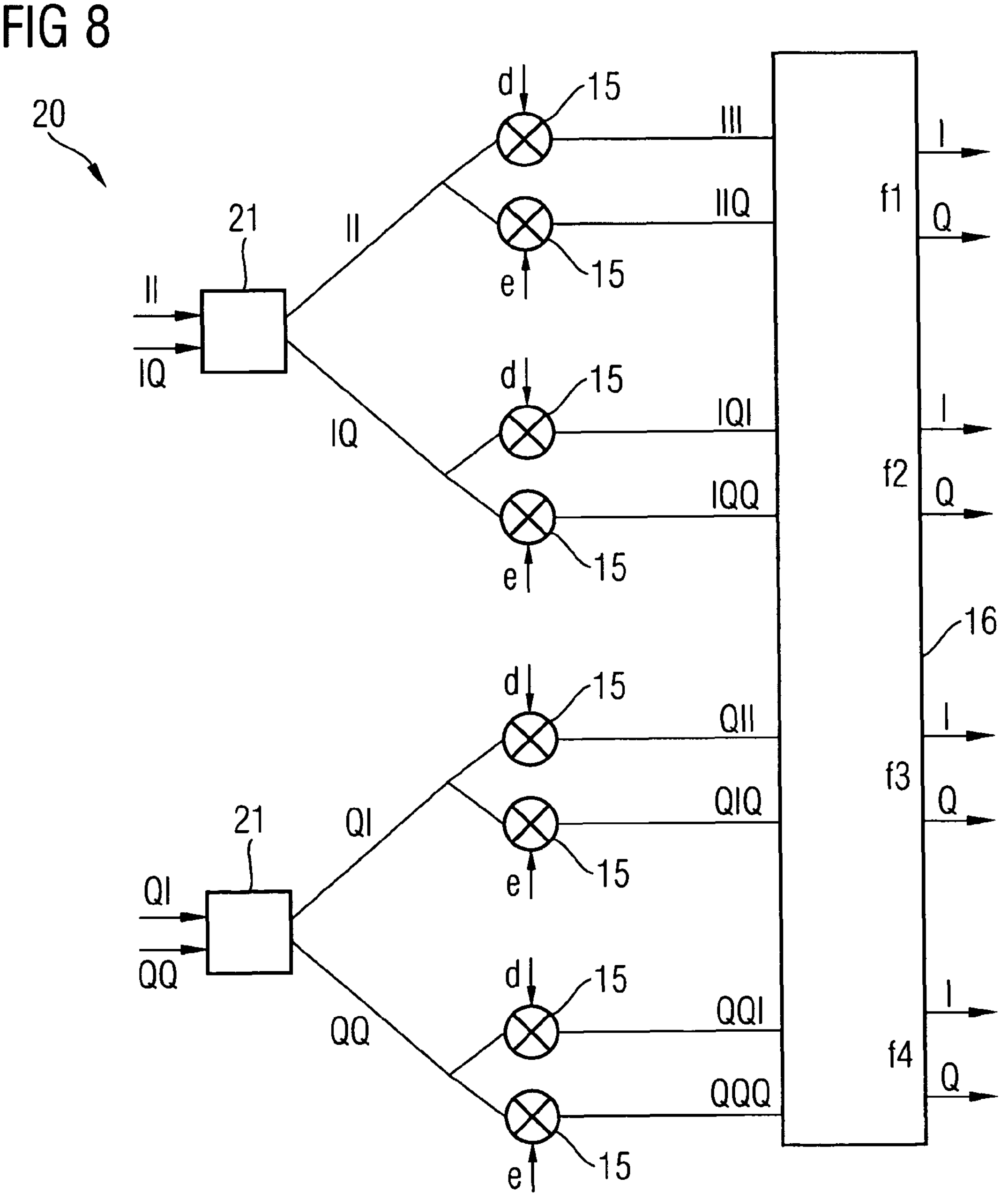
FIG. 8 is a block circuit diagram of a digital section of the embodiment of FIG. 5.

The digital unit 20 in the lower branch in the second embodiment is illustrated in FIG. 8. Analog-to-digital converters 21 digitize the signals II and IQ, and QI and QQ respectively in a comparable way to the analogue-to-digital converters 11 in FIG. 4. This is followed by a digital stage having multipliers 15, which corresponds to the second digital stage in the first embodiment in FIG. 4. Once again, signals III . . . QQQ are generated and these are fed to a calculating unit 16 which corresponds to that in the first embodiment.

The difference between the first and second embodiments thus lies in the fact that in the first embodiment there are one analogue stage and two digital stages provided for the processing, whereas in the second embodiment it is two analogue stages and one digital stage that are provided. The principle of the modes of operation is the same however.

In the second embodiment more analog-to-digital converters are required than in the first embodiment, namely twice as many. In return, the analogue-to-digital converters in the second embodiment operate at half the sampling frequency and are therefore easier to implement.

A further advantage of the first embodiment is that the separation of the different frequency bands, i.e., the mixing or multiplying in the digital processing unit, can be performed with greater exactness than with analogue IQ mixers. Which embodiment is preferred will thus depend on the accuracy required and the components available.

Depending on the number of frequency bands to be processed, there may of course also be more or fewer stages present and the division between digital and analogue stages may of course be adjusted to suit the particular requirements. If sufficiently fast analog-to-digital converters are available, then purely digital signal processing would of course also be conceivable in principle.

Nor is the present invention confined to the processing of the UWB signals which have been used as an example. In principle, any desired phase-shift modulated or quadrature-amplitude modulated part-signals which are transmitted in different frequency bands can be processed by the method according to the invention.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for demodulating a received signal in a circuit arrangement, the method comprising:

defining the received signal to comprise phase-shift modulated or amplitude-quadrature modulated individual part-signals which are transmitted in a plurality of different frequency bands, wherein the individual part signals are separate from each other and each include different pieces of data;

processing the received signal in a plurality of stages in succession, the plurality of stages including a first stage and succeeding stages, the succeeding stages including a last stage, the processing including:

multiplying all input signals to each of the stages by two respective mutually orthogonal signals to form two intermediate signals for each input signal;

wherein the intermediate signals in each of the stages except the last stage act as the input signals to whichever is the succeeding stage in the particular case and the received signal acts as the input signal to the first stage; and determining an in-phase and/or a quadrature component for each of the phase-shift modulated or amplitude-quadrature modulated individual part-signals transmitted in the plurality of different frequency bands by calculating a linear combination of intermediate signals from the last of the plurality of stages.

2. The method of claim 1, wherein, in the processing in the stages, comprising:

converting down the frequency bands of the received signal into a single frequency band of lower frequency.

3. The method of claim 1, comprising:

performing the processing in the final n stages, where n is at least 1, fully digitally.

4. The method of claim 3, comprising:

performing the multiplication of the input signals by the two mutually orthogonal signals in the final n stages by multiplication by factors of 1, 0 or −1 at four times the frequency of the particular input signal to the particular stage.

5. The method of claim 4, comprising performing the multiplication by factors of 1, 0 or −1 by sorting the sampled values of the particular input signal.

6. The method of claim 3, comprising performing a digitization of the input signals to the first of the final n stages at a sampling rate which is four times higher than the centre frequency of the input signals to the first of the final n stages.

7. The method of claim 3, wherein n is equal to 1 or 2.

8. The method of claim 1, comprising performing the processing in the first m stages, where m is at least 1, in analog fashion.

9. The method of claim 8, comprising generating mixed signals in the first m stages by multiplying the respective input signals by the respective mutually orthogonal signals, and bandpass filtering the mixed signals to generate the intermediate signals, with component parts of the mixed signals being filtered out whose frequencies do not correspond to a difference frequency between the frequency of the respective orthogonal signals and the frequency of frequency bands, from the plurality of different frequency bands, which are to be processed in the stages following the particular stage.

10. The method of claim 9, comprising performing the bandpass filtering of the mixed signals in each case by a polyphase filter.

11. The method of claim 8, wherein the mutually orthogonal signals in any given one of the first m stages are of a frequency which is between two adjoining ones of the frequency bands of the input signals in the given case.

12. The method of claim 8, wherein m is equal to 1 or 2.

13. The method of claim 1, comprising performing the calculation of the components of the phase-shift modulation or amplitude-quadrature modulation of the individual part-signals by setting up a system of linear equations which defines the relationship of the components of the phase-shift modulation or amplitude-quadrature modulation of the individual part-signals to the intermediate signals from the last of the plurality stages, and by solving this system of equations.

14. The method of claim 13, comprising defining the number of frequency bands processed as four, and wherein the number of stages is three and wherein the in-phase and quadrature components of the part-signals in the frequency bands processed are calculated from the following equations:

$$y1,I=A1-A4+B2+B3$$

$$y1,Q=-A2-A3+B1-B4$$

$$y2,I=A1+A4-B2+B3$$

$$y2,Q=A2-A3+B1+B4$$

$$y3,I=A1+A4+B2+B3$$

$$y3,Q=-A2+A3+B1+B4$$

$$y4,I=A1-A4-B2-B3$$

$$y4,Q=A2+A3+B1-B4,$$

where yi,I and yi,Q are the in-phase and quadrature components respectively of the part-signal in the ith frequency band, A1 is the III signal, A2 the IIQ signal, A3 the IQI signal, A4 the IQQ signal, B1 the QII signal, B2 the QIQ signal, B3 the QQI signal and B4 the QQQ signal of the intermediate signals from the last of the plurality stages, with each letter in the latter designations stating whether, in that stage for generating a given intermediate signal by multiplication which corresponds to the position of the letter, it is the in-phase or the quadrature component of the input signal in the given case which is formed.

15. The method of claim 1, wherein in the first stage, comprising dividing the plurality of different frequency bands into at least two groups which are processed separately.

16. The method of claim 1, comprising defining the plurality of different frequency bands to be in a range from 3.1 to 10.6 GHz.

17. The method of claim 1, comprising defining the received signal as an ultra wideband received signal.

18. An arrangement configured to demodulate a received signal which comprises phase-shift modulated or quadrature-amplitude modulated individual part-signals which are transmitted in a plurality of different frequency bands, the arrangement comprising:

a plurality of stages connected one downstream of the other for processing the received signal, the plurality of stages including a first stage and succeeding stages, the succeeding stages including a last stage, each stage having at least one multiplier configured to multiply all input signals to each stage by two respective mutually orthogonal signals to form two intermediate signals for each input signal, the processing stages being connected in such a way that the intermediate signals from each of the stages except the last stage act as input signals to the succeeding stage and the received signal acts as an input signal to the first stage; and an analyzing system configured to determine in-phase and/or quadrature components of the phase-shift modulated or amplitude-quadrature modulated individual part-signals transmitted in the plurality of different frequency bands by setting up a system of linear equations which defines the relationship of the components of the phase-shift modulated or amplitude-quadrature modulated individual part-signals to the intermediate signals from the last of the plurality of stages, and by solving this system of equations, wherein the individual part signals are separate from each other and each include different pieces of data.

19. The arrangement of claim 18, wherein the final n processing stages, where n is at least 1, are digital stages.

20. The arrangement of claim 19, wherein the final n processing stages are designed such that the multiplication of the input signals by the two mutually orthogonal signals in the final n stages is performed by multiplication by factors of 1, 0 or −1 at four times the frequency of the particular input signal to the particular stage.

21. The arrangement of claim 20, wherein the multiplication by factors of 1, 0 or −1 is performed by sorting the sampled values of the particular input signal.

22. The arrangement of claim 19, wherein the first of the final n stages comprises a digitizer configured to digitize the input signals at a sampling rate which is four times higher than the centre frequency of the input signals to the first of the final n stages.

23. The arrangement of claim 19, wherein n is equal to 1 or 2.

24. The arrangement of claim 18, wherein the first m processing stages, where m is at least 1, are analogue stages.

25. The arrangement of claim 24, wherein the first m stages are designed such that mixed signals which are generated in the first m stages by multiplying the respective input signals by the respective mutually orthogonal signals are bandpass filtered to generate the intermediate signals, with component parts of the mixed signals being filtered out whose frequencies do not correspond to a difference frequency between the frequency of the respective orthogonal signals and the frequency of frequency bands, from the plurality of different frequency bands, which are to be processed in the stages following the particular stage.

26. The arrangement of claim 25, wherein the bandpass filtering of the mixed signals is performed in each case by a polyphase filter.

27. The arrangement of claim 25, wherein the mutually orthogonal signals in any given one of the first m stages are of a frequency which is between two adjoining ones of the frequency bands of the input signals in the given case.

28. The arrangement of claim 25, wherein m is equal to 1 or 2.

29. The arrangement of claim 18, wherein the number of frequency bands processed is four, wherein the number of stages is three and wherein the in-phase and quadrature components of the part-signals in the frequency bands processed are determined from the following equations:

$$y1,I=A1-A4+B2+B3$$

$$y1,Q=-A2-A3+B1-B4$$

$$y2,I=A1+A4-B2+B3$$

$$y2,Q=A2-A3+B1+B4$$

$$y3,I=A1+A4+B2+B3$$

$$y3,Q=-A2+A3+B1+B4$$

$$y4,I=A1+A4-B2-B3$$

$$y4,Q=A2+A3+B1-B4,$$

where yi,I and yi,Q are the in-phase and quadrature components respectively of the part-signal in the ith frequency band, A1 is the III signal, A2 the IIQ signal, A3 the IQI signal, A4 the IQQ signal, B1 the QII signal, B2 the QIQ signal, B3 the QQI signal and B4 the QQQ signal of the intermediate signals from the last of the plurality stages, with each letter in the latter designations stating whether, in that stage for generating a given intermediate signal by multiplication which corresponds to the position of the letter, it is the in-phase or the quadrature component of the input signal in the given case which is formed.

30. The arrangement of claim 18, wherein the received signal is an ultra wideband received signal.

31. An arrangement for demodulating a received signal which comprises phase-shift modulated or quadrature-amplitude modulated individual part-signals which are transmitted in a plurality of different frequency bands, the arrangement comprising:

a plurality of stages connected one downstream of the other for processing the received signal, the plurality of stages including a first stage and succeeding stages, the succeeding stages including a last stage, each stage having means for multiplying all input signals to each stage by two respective mutually orthogonal signals to form two intermediate signals for each input signal, the processing stages being connected in such a way that the intermediate signals from each of the stages except the last stage act as input signals to the succeeding stage and the received signal acts as an input signal to the first stage; and means for determining in-phase and/or quadrature components of the phase-shift modulated or amplitude-quadrature modulated individual part-signals transmitted in the plurality of different frequency bands by setting up a system of linear equations which defines the relationship of the components of the phase-shift modulated or amplitude-quadrature modulated individual part-signals to the intermediate signals from the last of the plurality of stages, and by solving this system of equations, wherein the individual part signals are separate from each other and each include different pieces of data.

32. A method for demodulating a received signal in a circuit arrangement, the method comprising:

defining the received signal to comprise phase-shift modulated or amplitude-quadrature modulated individual part-signals which are transmitted in a plurality of different frequency bands, wherein the individual part signals are separate from each other and each include different pieces of data;

processing the received signal in a plurality of stages in succession, the plurality of stages including a first stage and succeeding stages, the succeeding stages including a last stage, the processing including:

digitally multiplying all input signals to each of the final n stages by two respective mutually orthogonal signals to form two intermediate signals for each input signal;

wherein the intermediate signals in each of the stages except the last stage act as the input signals to whichever is the succeeding stage in the particular case and the received signal acts as the input signal to the first stage; and determining an in-phase and/or a quadrature component for each of the phase-shift modulated or amplitude-quadrature modulated individual part-signals transmitted in the plurality of different frequency bands by calculating a linear combination of intermediate signals from the last of the plurality of stages.

33. A method for demodulating a received signal in a circuit arrangement, the method comprising:

defining the received signal to comprise phase-shift modulated or amplitude-quadrature modulated individual part-signals which are transmitted in a plurality of different frequency bands, wherein the individual part signals are separate from each other and each include different pieces of data;

processing the received signal in a plurality of stages in succession, the plurality of stages including a first stage and succeeding stages, the succeeding stages including a last stage, the processing including:

multiplying all input signals to each of the stages by two respective mutually orthogonal signals to form two intermediate signals for each input signal;

wherein the intermediate signals in each of the stages except the last stage act as the input signals to whichever is the succeeding stage in the particular case and the received signal acts as the input signal to the first stage;

determining an in-phase and/or a quadrature component for each of the phase-shift modulated or amplitude-quadrature modulated individual part-signals transmitted in the plurality of different frequency bands by calculating a linear combination of intermediate signals from the last of the plurality of stages; and performing the processing in the final n stages, where n is at least 1, fully digitally.

* * * * *